(12) United States Patent
Goel (10) Patent No.: US 7,639,252 B2
(45) Date of Patent: Dec. 29, 2009

(54) UNIFIED TESSELLATION CIRCUIT AND METHOD THEREFOR

(75) Inventor: Vineet Goel, Winter Park, FL (US)

(73) Assignee: ATI Technologies ULC, Markham, Ontario (CA)

( * ) Notice: Subject to any disclaimer, the term of this patent is extended or adjusted under 35 U.S.C. 154(b) by 48 days.

(21) Appl. No.: 11/161,669

(22) Filed: Aug. 11, 2005

(65) Prior Publication Data

US 2006/0050072 A1    Mar. 9, 2006

Related U.S. Application Data

(60) Provisional application No. 60/600,940, filed on Aug. 11, 2004.

(51) Int. Cl.
G06T 15/00    (2006.01)
G06T 15/30    (2006.01)

(52) U.S. Cl. ..................................... 345/423
(58) Field of Classification Search .................. 345/423
See application file for complete search history.

(56) References Cited

U.S. PATENT DOCUMENTS

| | | | | |
|---|---|---|---|---|
| 5,357,599 | A * | 10/1994 | Luken | 345/627 |
| 5,821,940 | A | 10/1998 | Morgan et al. | |
| 5,914,722 | A * | 6/1999 | Aleksic | 345/423 |
| 6,057,848 | A * | 5/2000 | Goel | 345/423 |
| 6,078,331 | A | 6/2000 | Pulli et al. | |
| 6,100,894 | A * | 8/2000 | Goel | 345/423 |
| 6,211,883 | B1 * | 4/2001 | Goel | 345/423 |
| 6,504,537 | B1 * | 1/2003 | Moreton et al. | 345/423 |
| 6,597,356 | B1 * | 7/2003 | Moreton et al. | 345/423 |
| 6,600,488 | B1 * | 7/2003 | Moreton et al. | 345/423 |
| 6,624,811 | B1 * | 9/2003 | Moreton et al. | 345/423 |
| 6,674,433 | B1 * | 1/2004 | Junkins | 345/423 |
| 6,697,063 | B1 * | 2/2004 | Zhu | 345/421 |
| 6,819,325 | B2 | 11/2004 | Boyd et al. | |
| 6,906,716 | B2 * | 6/2005 | Moreton et al. | 345/423 |

(Continued)

FOREIGN PATENT DOCUMENTS

EP    0930582 A2    7/1999

OTHER PUBLICATIONS

Moreton, Henry; Watertight Tessellation Using Forward Differencing; SIGGRAPH Eurographics Workshop; 2001; pp. 25-32; NVIDIA Corporation.

*Primary Examiner*—Ulka Chauhan
*Assistant Examiner*—Crystal Murdoch
(74) *Attorney, Agent, or Firm*—Vedder Price P.C.

(57) ABSTRACT

A hardware tessellation circuit serves as a unified hardware parametric coordinate generator for providing parametric coordinates for tessellation. The tessellation circuit includes control logic that receives tessellation instruction information, such as an instruction indicating which type of multiple tessellation operations to perform, on an incoming primitive wherein the different types of tessellation include discrete tessellation, continuous tessellation and adaptive tessellation. The tessellation circuit also includes shared tessellation logic that is controlled by the control logic, and includes a plurality of shared logic units, such as arithmetic logic units, that are controllable by the control logic based on the type of tessellation detected to be used for the incoming primitive. The shared tessellation logic is controlled to reuse at least some of the logic units for two different tessellation operations defined by the tessellation type information.

16 Claims, 9 Drawing Sheets

U.S. PATENT DOCUMENTS 6,940,515 B1 *  9/2005  Moreton et al. ............. 345/522
6,965,908 B2   11/2005  Shaw
7,109,987 B2    9/2006  Goel et al.
7,200,532 B1 *  4/2007  Cheng ........................... 703/2
2004/0085313 A1 *  5/2004  Moreton et al. ............. 345/423
2004/0113909 A1 *  6/2004  Fenney et al. ............... 345/419
2004/0227755 A1 * 11/2004  Sfarti .......................... 345/423
2006/0238535 A1   10/2006  Goel et al.

* cited by examiner

| MODE NAME | TESSELLATOR OUTPUT | | | | | |
|---|---|---|---|---|---|---|
| | TWO CYCLE OUTPUT MODE | TESS CYCLE 0 OUTPUT (ALL FIXED) | CYCLE 0 FORMAT | TESS CYCLE 1 OUTPUT (ALL FIXED) | CYCLE 1 FORMAT | VGT OUTPUT PRIM TYPE |
| LINE LIST - SINGLE PASS | 0 | 2 STD INDX 1 COORD | [I1,I0,U] | -- | -- | LINE LIST |
| TRI LIST - SINGLE PASS | 1 | 3 COORD | [W,V,U] | 3 STD INDX | [I2,I1,I0] | TRI LIST |
| QUAD LIST - SINGLE PASS | 1 | 1 STD INDX 2 COORD | [I0,V,U] | 3 STD INDX | [I3,I2,I1] | TRI LIST |
| L-PATCH - SINGLE PASS | 0 | 1 STD INDX 1 QUAD ID 1 COORD | [I0,Q,U] | -- | -- | LINE LIST |
| T-PATCH - SINGLE PASS | 1 | 3 COORD | [W,V,U] | 1 STD INDX 1 QUAD ID | [Q, I0] | TRI LIST |
| R-PATCH - SINGLE PASS | 1 | 1 STD INDX 2 COORD | [V,U,I0] | 1 QUAD ID | [Q] | TRI LIST |
| LAST OF MULTI-PASS HOS LINE (NON-ADAPTIVE) | 0 | 1 AUTO-INDEX 1 QUAD ID 1 COORD | [I0,Q,U] | -- | -- | LINE LIST |
| LAST OF MULTIPASS HOS LINE (ADAPTIVE) | 0 | 1 AUTO-INDEX 1 QUAD ID 1 COORD | [I0,Q,U] | -- | -- | LINE LIST |
| LAST OF MULTI-PASS HOS TRI (NON-ADAPTIVE) | 1 | 3 COORD | [W,V,U] | 1 AUTO-INDEX 1 QUAD ID | [Q, I0] | TRI LIST |
| LAST OF MULTI-PASS HOS TRI (ADAPTIVE) | 1 | 3 COORD | [W,V,U] | 1 AUTO-INDEX 1 QUAD ID | [Q, I0] | TRI LIST |
| LAST OF MULTI-PASS HOS QUAD (NON-ADAPTIVE) | 1 | 1 AUTO-INDEX 2 COORD | [V,U,I0] | 1 QUAD ID | [Q] | TRI LIST |
| LAST OF MULTI-PASS HOS QUAD (ADAPTIVE) | 1 | 1 AUTO-INDEX 2 COORD | [V,U,I0] | 1 QUAD ID | [Q] | TRI LIST |

UNIFIED TESSELLATION CIRCUIT AND METHOD THEREFOR

RELATED APPLICATIONS

This application claims the benefit of U.S. Provisional Application Ser. No. 60/600,940 filed Aug. 11, 2004, entitled "UNIFIED TESSELLATION CIRCUIT AND METHOD THEREFOR", having as an inventor Vineet Goel, and owned by instant assignee and hereby incorporated by reference in its entirety.

FIELD OF THE INVENTION

The invention relates generally to apparatus and methods that perform tessellation on primitives such as those used in graphics processing systems, and more particularly to apparatus and methods that perform multiple types of tessellation.

BACKGROUND OF THE INVENTION

Tessellation circuits and methods are known in graphics processing systems to divide primitives into subprimitives represented by subvertices. Generally, primitive tessellation can be done in three ways; these are known as discrete tessellation, continuous tessellation, and adaptive tessellation. As known in the art, tessellation may be carried out to break down a primitive, such as a quad primitive which is defined by four vertices, triprimitives which are defined by three vertices, a line which may be defined by two vertices, or any other suitable primitive, into smaller subprimitives in an effort to get a more accurate depiction of an outer shape of a primitive, displacement mapping, or for any other suitable purpose. For discrete tessellation, an integer tessellation level per primitive is used. For example, if a line is a primitive, and the tessellation level is one, the line is divided into two equally spaced segments. When the tessellation level is two, the line is broken into three segments. The level is taken from the perspective of an edge of a primitive. Similarly, a triangle is subdivided into four sub-triangles for level one tessellation.

For continuous tessellation, floating point or fractional levels of tessellation per primitive are provided so that for example a tessellation level of 1.1 or 1.2 may be used to get a finer granularity of a breakdown of a primitive into smaller subprimitives. Adaptive tessellation also employs a fractional level of tessellation for each edge of a primitive and typically includes the application of continuous tessellation to an inner portion of the primitive and a seaming tessellation at the edges of primitives. With adaptive tessellation, the process typically includes performing continuous tessellation by tessellating uniformly, a primitive shape within the primitive being tessellated and applying an adaptive tessellation technique to an area outside the uniformly tessellated area.

Known tessellation engines are typically limited in their operation. For example, a typical tessellation engine may only accommodate one type of primitive such as a triangle primitive. In addition, tessellation engines may also typically carry out only one type of tessellation such as discrete or continuous tessellation. However, software based adaptive tessellation techniques are also known wherein a host processor may carry out an adaptive tessellation operation per primitive. This is typically performed since implementation of a tessellation engine in hardware can require large amounts of memory but memory is typically limited in graphics processors or other devices that carry out some type of tessellation. The software adaptive tessellation approach may also carry out another type of tessellation namely continuous tessellation. However such known techniques typically use a forward difference method which can result in holes between shared edges due to error that can be generated utilizing the forward difference method. This can result in discontinuous image generations. The algorithms to avoid holes between adjacent primitive edges tend to be complex and costly if implemented in hardware.

Since a host processor such as a CPU is required to carry out the software based adaptive tessellation using the forward difference method, lower precision can typically result and also decrease the CPU performance since it is required to carry out the tessellation operation to determine the tessellation vertices which may then be passed, for example, to a graphics processor.

Accordingly, a need exists for a tessellation circuit that does not require a host processor to carry out tessellation vertex generation but that would also accommodate at least all three types of tessellation. Alternatively it would be desirable to provide a tessellation circuit that provided both continuous and adaptive tessellation but that did not unnecessarily burden a host processor in the computations, while at the same time, minimizing the hardware cost.

BRIEF DESCRIPTION OF DRAWINGS

The invention will be more readily understood in view of the following description when accompanied by the below figures and wherein like reference numerals represent like elements.

DETAILED DESCRIPTION OF THE INVENTION

Briefly, a hardware tessellation circuit serves as a unified hardware parametric coordinate generator for providing parametric coordinates for tessellation. The tessellation circuit includes control logic that receives tessellation instruction information, such as an instruction indicating which type of tessellation to perform on an incoming primitive wherein the different types of tessellation include discrete tessellation, continuous tessellation, and adaptive tessellation. The tessellation circuit also includes shared tessellation logic that is controlled by the control logic and includes a plurality of shared logic units, such as arithmetic logic units, that are controllable by the control logic based on the type of tessellation detected to be used for the incoming primitive. The shared tessellation logic is controlled to reuse at least some of the logic units for two different tessellation operations defined by the tessellation type information. The tessellation circuit can tessellate multiple different primitive types, such as lines, triangles, quad primitives, line patches, tri patches and rectangular patches. The tessellation circuit also generates associated parametric coordinates such as subprimitive coordinates in parametric space, for different types of tessellation wherein the different types of tessellation include, in one example, discrete tessellation, continuous tessellation, and adaptive tessellation. The generated subprimitive coordinates are then passed through a vertex shader or other suitable processing logic which computes the tessellation vertices for a desired patch or primitive.

In one embodiment, the shared tessellation logic includes set-up logic, edge walker logic, and output logic, wherein hardware in the set-up logic, such as ALUs, and hardware in the output logic, such as ALUs, are re-used for multiple different tessellation types. In addition, the state machine in the edge walker logic may share similar states for multiple different tessellation types. Accordingly, a more robust hardware tessellation engine is provided that operates on multiple primitive types and provides different tessellation operations while reusing some hardware to reduce costs and provide efficient operation. Other advantages will be recognized of ordinary skill in the art.

Figure 1:
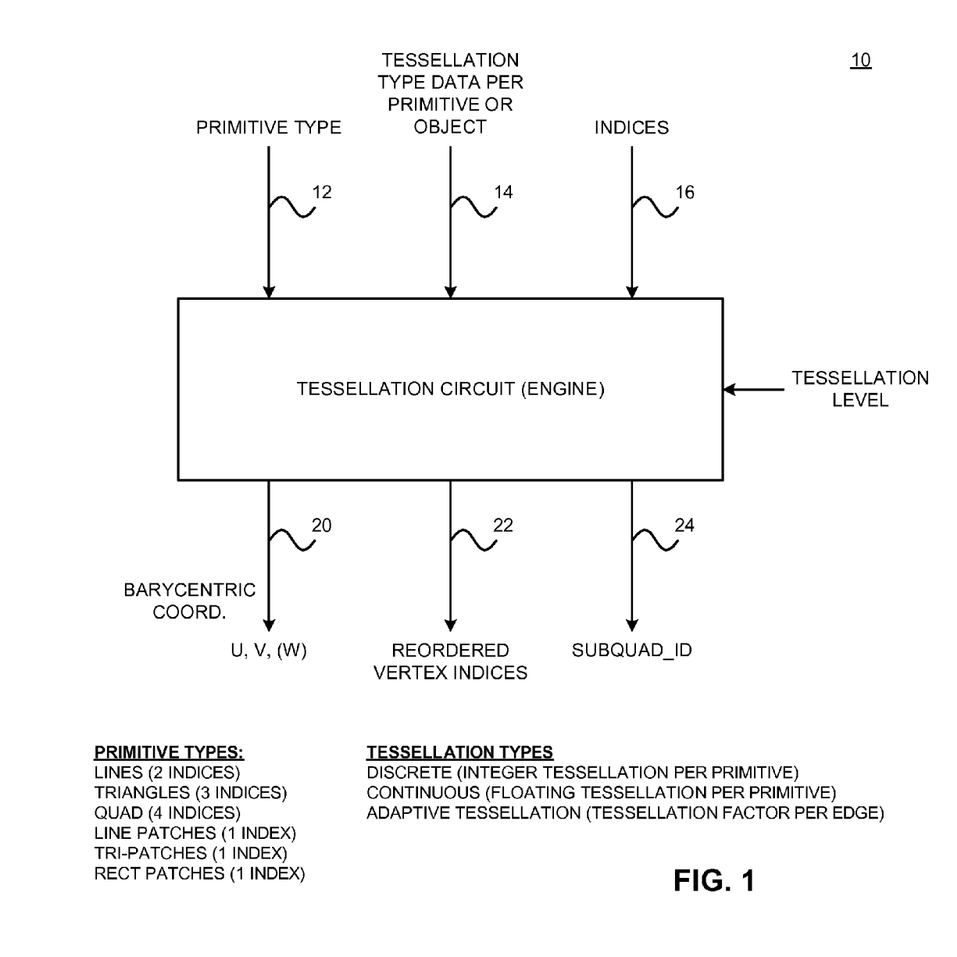
FIG. 1 is a functional block diagram illustrating one example of a tessellation circuit in accordance with one embodiment of the invention.

FIG. 1 is a block diagram illustrating one example of a tessellation circuit 10 which includes shared tessellation logic that is reused for different tessellation operation types. The tessellation circuit 10 receives signals specifying primitive type 12, tessellation level and tessellation type 14 and primitive vertex indices 16. The primitive type data 12 indicates the type of primitive for which parametric coordinates are desired. Examples of primitive types include lines which may be defined, for example, by the index data 16 representing two indices; triangles represented by index data 16 having three indices; quad primitives having four indices; line patches having one index; tri patches defined by 1 index; and rectangular patches also identified by one index. For lines, triangle, and quad primitive types, indices indicate the address or pointer where vertex data is stored. For line, rect and tri patches, one index is a pointer to number of vertex indices describing line, rect and tri patches. The tessellation type data 14 is provided for each primitive or object of interest and again may be embedded as part of the tessellation signals identifying what type of tessellation should be applied to a given primitive or object. In this example, the tessellation type data 14 represents one of three different tessellation types, namely, discrete tessellation which uses an integer tessellation per primitive, continuous tessellation which uses floating point tessellation per primitive, and adaptive tessellation which utilizes a tessellation level per edge of a primitive. The indices data represents, for example, the primary vertex information or pointers to the primary vertex information.

The tessellation circuit 10 also receives tessellation level data 18 which may be user selected through a suitable software driver or programmed into a register (not shown) which indicates the level of tessellation desired. For example, if the tessellation type is discrete tessellation, the tessellation level could be an integer such as 1, 2, 3, 4, etc. If the tessellation type data 14 indicates that continuous tessellation is to be applied to the given primitive, the tessellation level may indicate a floating point tessellation level per primitive, such as 1.2, 1.4, 3.2, or any other suitable floating point value. For adaptive tessellation one tessellation level per edge is sent to the tessellation engine.

The tessellation circuit 10 produces subprimitive parametric coordinates 20 for use by a tessellation vertex determinator. Depending upon the type of primitive, the parametric coordinates may be barycentric coordinates (UVW), UV coordinates or Ucoordinates or any other suitable parametric coordinates for the subprimitives. If desired, the tessellation circuit 10 may also produce reordered indices 22 that may be reordered for avoiding holes between edges of adjacent primitives. When the primitive type is a patch primitive (line, tri or rect patches), the tessellation circuit may also output quad identification data 24, which is used in reordering indices of patches in the evaluation shader.

The subprimitive coordinates 20 are produced in parametric space and are passed to, in one example, shader pipes, so the shader pipes can determine subtriangle vertice information in XYZ space. As such, the quad identification data 24 is a subquad identifier, which identifies a subquad primitive in the larger primitive identified by indices data 16. The quad id is used reordering indices of patches in order to avoid holes between two adjacent patches. The tessellation circuit 10 is implemented in hardware to effect a unified hardware parametric coordinate generator.

Figure 2:
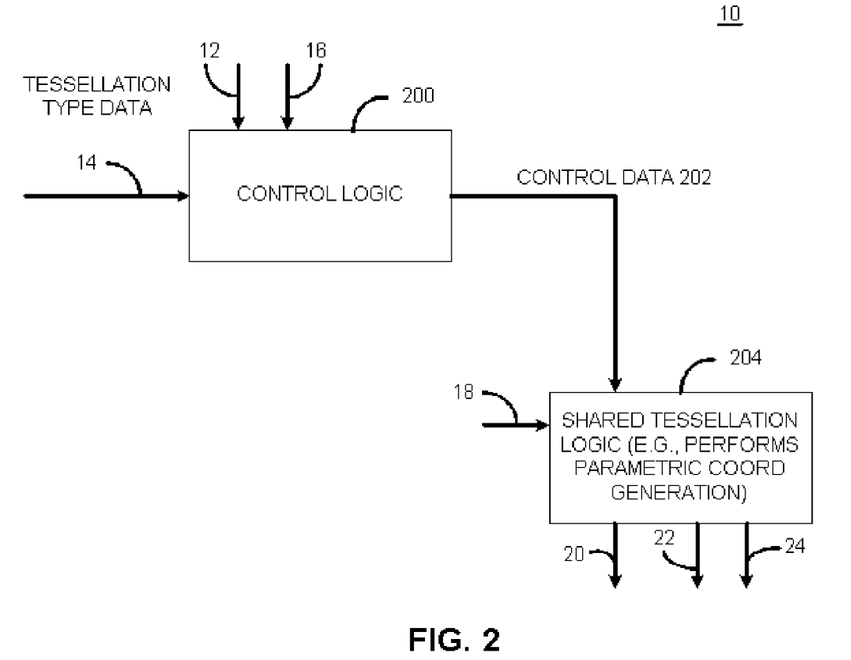
FIG. 2 is a functional block diagram illustrating one example of a tessellation circuit in accordance with one embodiment of the invention.

FIG. 2 is a functional block diagram illustrating one example of the tessellation circuit 10 which includes control logic 200 that receives the tessellation type data 14 from an incoming instruction or other source, and generates control data 202 for shared tessellation logic 204 to control the shared tessellation logic 204 to carry out one of multiple tessellation operations based on the tessellation type data 14. The shared tessellation logic 204 performs parametric coordinate generation to generate the parametric coordinate data 20 and other data as noted in FIG. 1. As such, the control logic 200 receives tessellation instruction information 14 and determines one of a plurality of different types of tessellation to be performed on an input primitive identified, for example, by the indices data 16 and primitive type data 12.

The control logic 200 may be any suitable logic that performs the functions described herein. Shared tessellation logic 204 is controlled by the control data 202 from the control logic 200 based on the type of tessellation detected to be used for the incoming primitive. The shared tessellation logic 204 reuses at least some logic units for multiple different tessellation types. For example, the shared tessellation logic 204 performs both continuous tessellation and adaptive tessellation operations and as such shares some of the same logic units for both types of tessellation.

Figure 3:
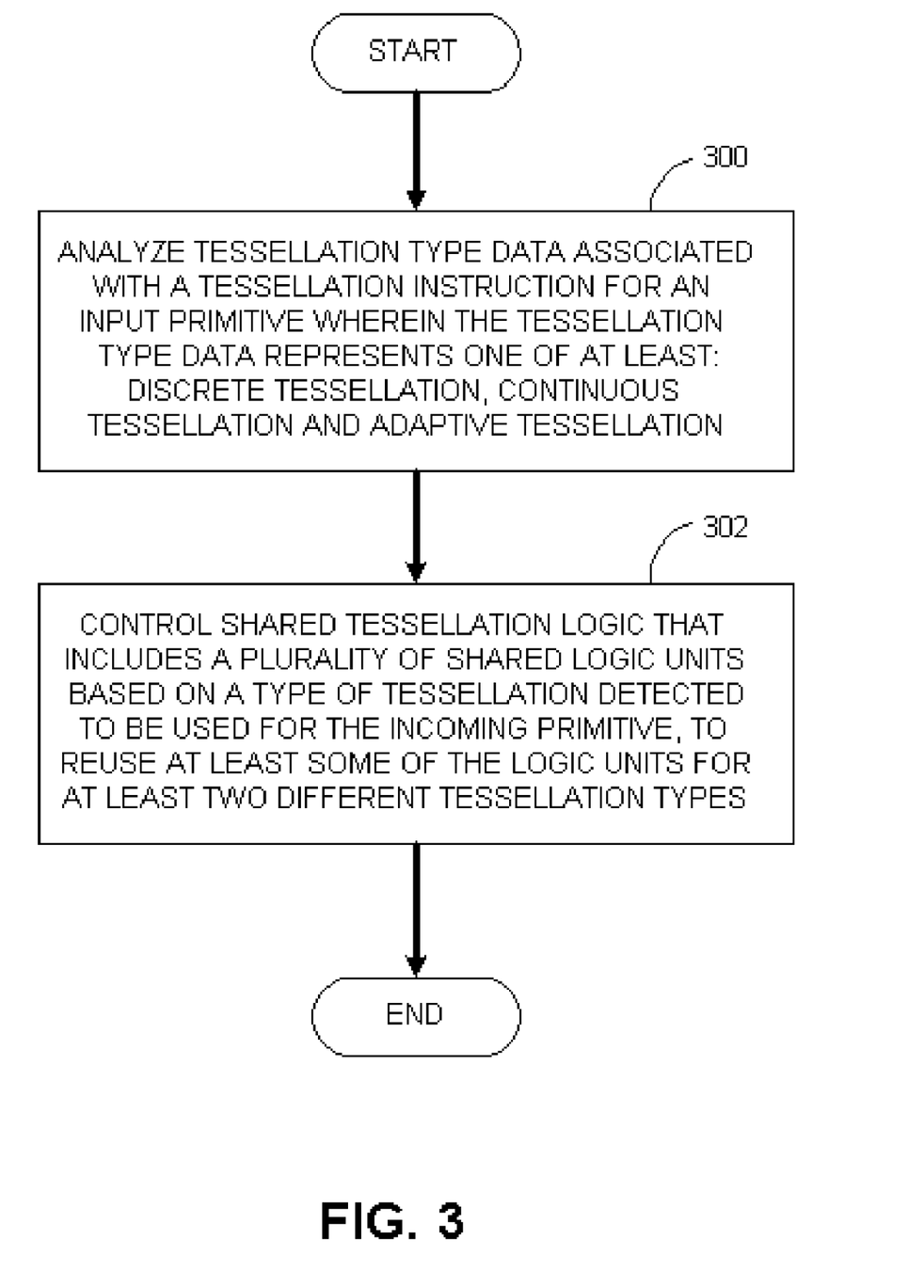
FIG. 3 is a flowchart illustrating one example of a method for providing primitive tessellation in accordance with one embodiment of the invention.

FIG. 3 illustrates one example of a method for tessellating primitives that is carried out, for example, by the tessellation circuit 10 shown in FIG. 1 or any other suitable structure. As shown in block 300, the method includes analyzing tessellation type data 14 associated with a tessellation instruction for an input primitive wherein the tessellation type data 14 may represent one of at least discrete tessellation, continuous tessellation and adaptive tessellation. As shown in block 302, the method also includes controlling shared tessellation logic 204 that includes a plurality of shared logic units. Controlling shared tessellation logic 204 is based on a type of tessellation detected to be used for the incoming primitive in order to reuse at least some of the logic units for at least two different tessellation types. The process then ends and begins again when a new primitive is to be tessellated. As such, this method may be carried out on a per primitive basis.

Figure 4:
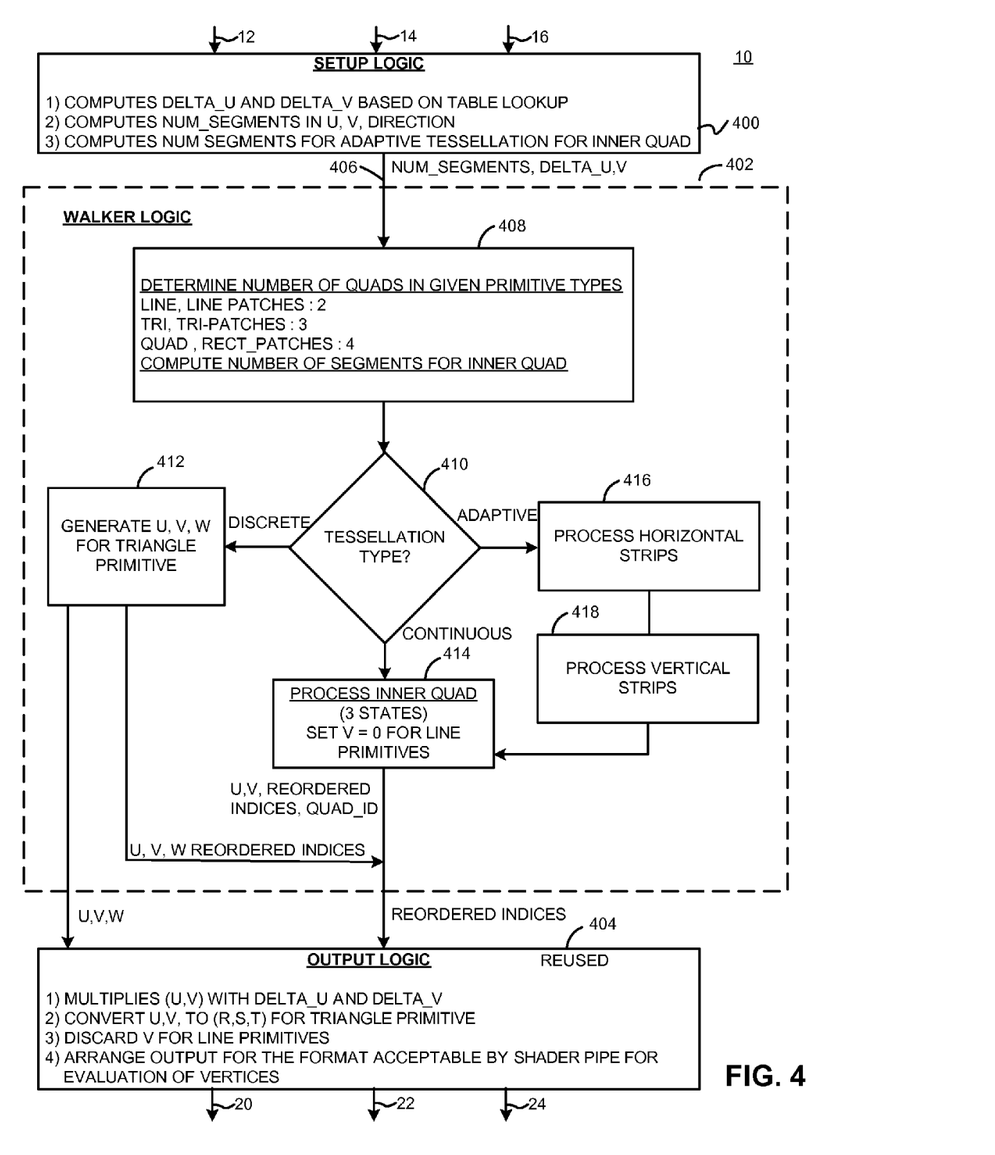
FIG. 4 is a combination of a functional block diagram and flowchart illustrating one example of a tessellation circuit in accordance with one embodiment of the invention.

FIG. 4 is a combination of a block diagram and flow chart illustrating one example of the tessellation circuit 10 which includes set-up logic 400, walker logic 402, and output logic 404. The set-up logic 400 and the output logic 404 include some logic units that are reused for carrying out different tessellation operations for multiple tessellation types. In addition the walker logic 402, which in this example is a state machine, reuses some states for both continuous tessellation and adaptive tessellation operations.

The set-up logic 400 may be any suitable logic and computes Delta_U and Delta_V data based on one or more lookup tables. Delta_U and Delta_V are segments of a primitive in the UV coordinate space. The set-up logic 400 also computes the number of segments (NUM_Segments) in the UV directions for a given edge of a primitive. In addition, the set-up logic 400 computes the number of segments for an inner quad primitive for adaptive tessellation. Sections of the set-up logic are reused for all tessellation types and primitive types. The hardware reused is look up table, computing delta_u and delta_v and num_segments. An example of this is shown in the attached diagram (i), (ii) and (iii) in the TE spec.

The set-up logic 400 provides the number of segments data 406 to the walker logic 402 along with primitive type and tessellation type.

The walker logic 402 as shown in block 408, includes logic that determines the number of quads in a given primitive type. For example, if a triangle is the primitive type the walker logic determines the number of quads in such primitive being 3. The setup logic 400 also computes the number of segments for an inner quad, for example, where adaptive tessellation is required.

Figure 7:
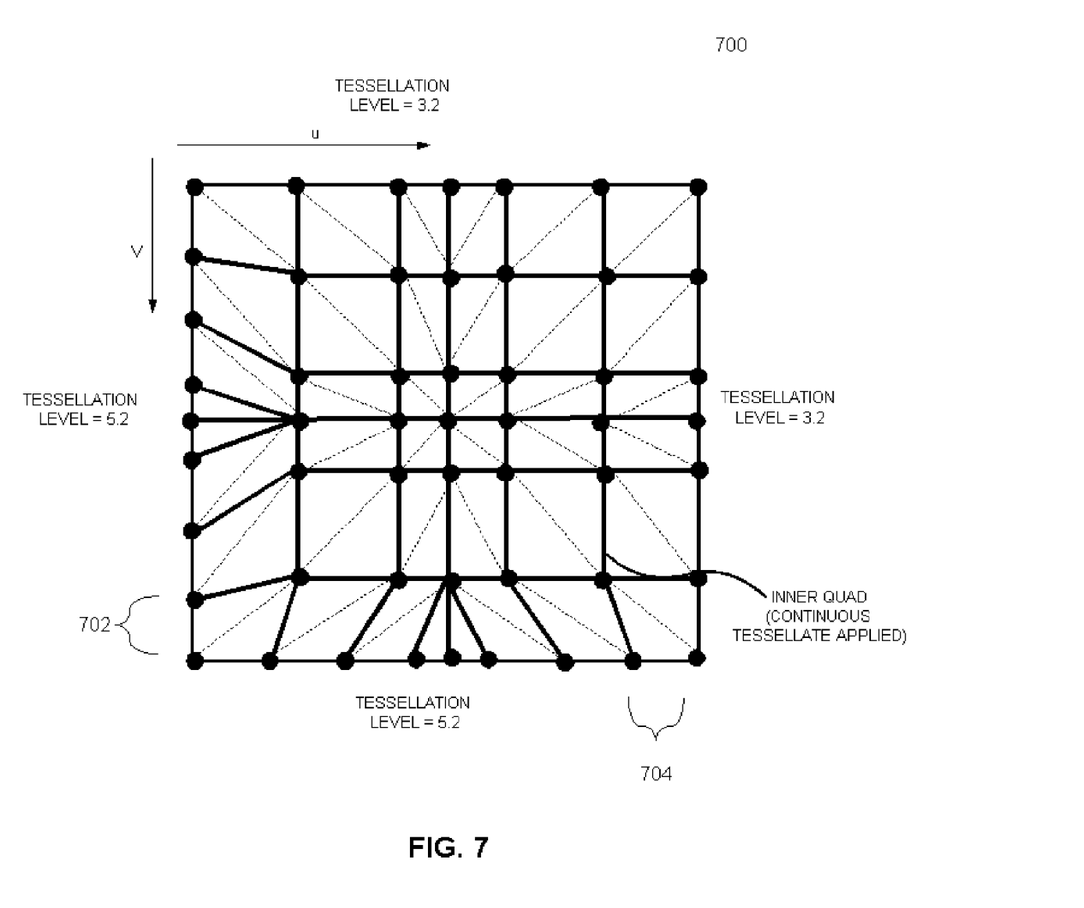
FIG. 7 is a diagram illustrating a tessellated quad primitive that has been tessellated using an adapted tessellation technique.

For example, referring to FIG. 7, an inner quad 700 may be determined for an adaptive tessellation type in a similar manner as done for continuous tessellations. In this example, the inner quad tessellation in u,v direction is determined by minimum tessellation level in u and v direction. The outer window of the inner quad may be tessellated using adaptive tessellation as shown by the angled lines wherein a quad is tessellated using multiple sub-triangles. As such, a two pass adaptive tessellation operation may be performed. However, any suitable technique may also be used. One example is described in co-pending application entitled METHOD AND APPARATUS FOR DUAL PASS ADAPTIVE TESSELLATION, Ser. No. 10/790,952, incorporated herein by reference.

Referring back to FIG. 4, as shown in block 410, the walker logic also determines the tessellation type as one of three types based on the tessellation type data. If the tessellation type is discrete, the walker logic generates the UVW for a triangle primitive and as shown in block 412 it may output the UVW reordered indices to the output logic.

The logic that carries out block 408 may be shared and reused for all tessellation types such as the states that control the determination of the quads for a given primitive type or compute the number of segments for an inner quad. As shown in block 414, if the tessellation type data indicates a continuation tessellation is to be performed, the walker logic processes inner quads by representing them in three states and sets V, for the UV equal to zero for line primitives. The resulting outputs are the UV reordered indices and any quad identifiers for patch primitive types.

Referring to block 416, if adaptive tessellation has been indicated by the tessellation type data 14, the walker logic processes horizontal strips of the primitive and as shown in block 418 processes vertical strips of the primitive that are outside the inner quad. For example, as shown in FIG. 7 the horizontal strip may be represented as 702 and a vertical strip may be represented for example, as 704. As shown in block 414, the walker logic then processes the inner quad 700. The states that control this process are shared for both adaptive and continuous tessellation since adaptive tessellation uses a continuous tessellation operation for an inner quad.

The output logic 404 multiplies the UV coordinates from walker unit with the Delta_U and Delta_V values to compute actual u,v, parametric coordinate within a primitive for a sub-vertex. If the triangle or tri patch primitive type is used, u,v coordinates are converted to (r, s, t) coordinates which represent bary-centric coordinates for a sub-vertex within a triangular primitive. It also discards the V data for line primitive types and arranges output in a format acceptable by later processing such as a shader pipe which determines the vertices of the subprimitives identified by the parametric coordinates.

Figure 5:
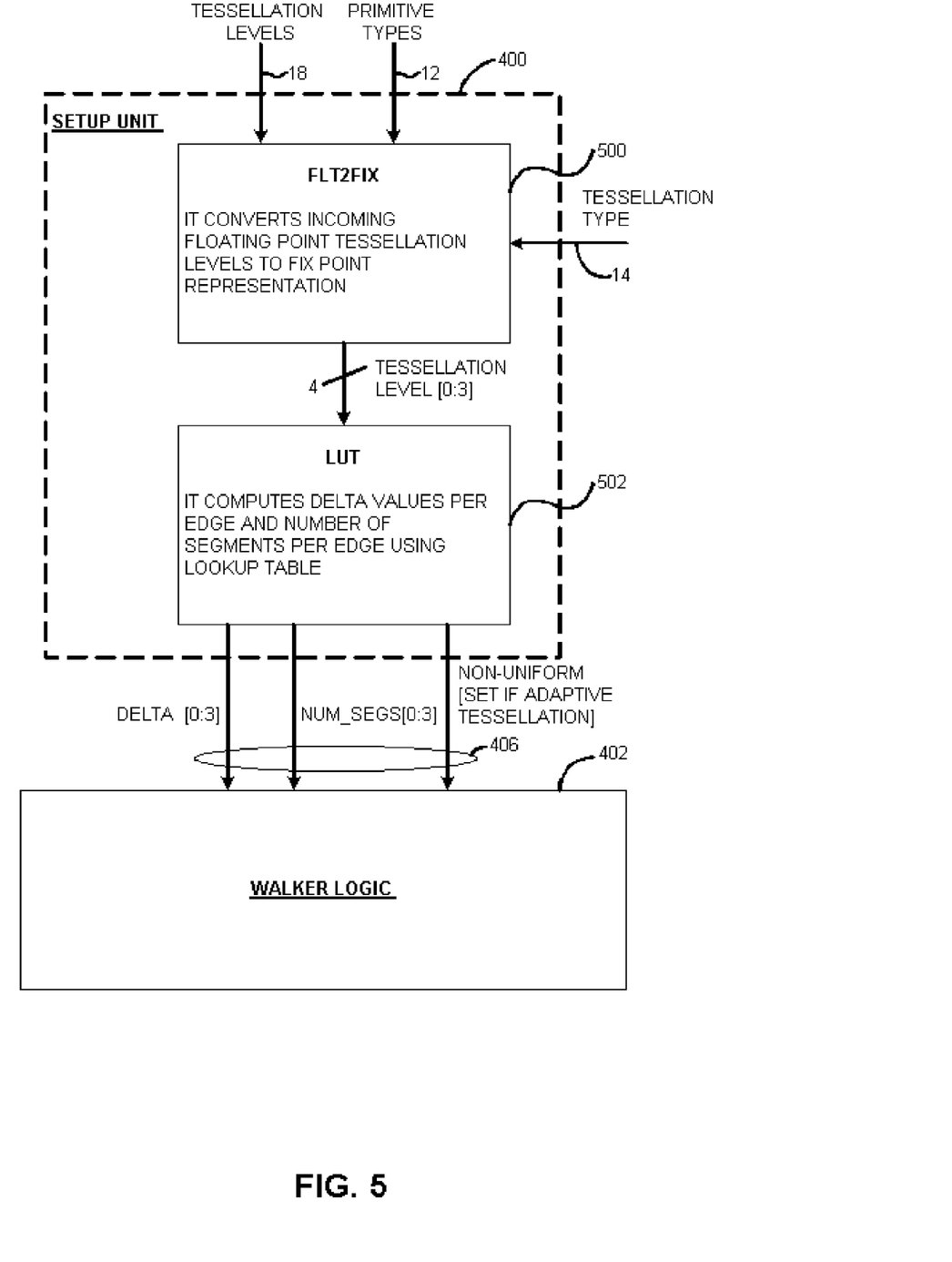
FIG. 5 is a functional block diagram illustrating one example of a shared setup unit that is shared for multiple types of tessellation in accordance with one embodiment of the invention.

FIG. 5 illustrates one example of the set up unit 400 as including a floating to fixed point converter 500 which converts incoming floating point tessellation levels 18 to fix point representations and in this example uses 4 bits for this designation. The set up unit 400 also includes a look up table 502 and an associated logic to compute the Delta U and Delta V values on a per edge basis and a number of segments per edge using the look-up table as known in the art. The lookup table 502 consists of 1/x value for a given integer level tessellation x. For floating point tessellation level such as x.f, its reciprocal is computed using $(1/x)*(1-f)+1/(x+1)*f$ where $1/x$ and $1/(x+1)$ are read from lookup table. The resulting Delta values and number of segments and, if desired, whether the primitive is non-uniform or whether the tessellation is non-uniform, such as in the case of adapted tessellation, is passed to the walker logic.

Figure 6:
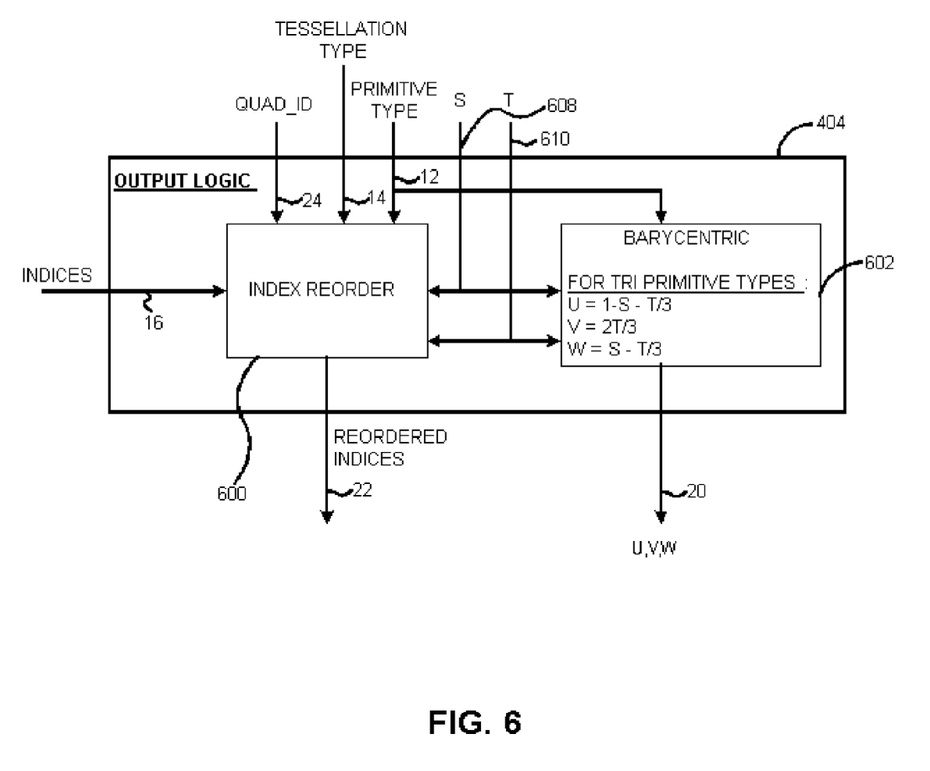
FIG. 6 is a functional block diagram illustrating, one example of a shared output unit in a tessellation circuit in accordance with embodiment of the invention.

FIG. 6 is a block diagram illustrating one example of the output logic 404, which includes index reordering logic 600 and a barycentric coordinate generator 602. The index reordering logic 600 uses the tessellation type data 14, primitive type data 12 and whether or not there are sub-quads to reorder indexes if for example, indices are shared with neighboring sub-primitives. The barycentric coordinate generator 602, generates barycentric coordinates UVW for tri-primitive types using s and t coordinates coming from walker unit, shown as 608 and 610 as provided by the walker logic. The index reordering logic at 600 is reused for both continuous and adaptive tessellation types for example. Likewise the barycentric coordinate generator may be reused for generating barycentric coordinates for triangular primitive types for all tessellation types. Accordingly this is additional hardware that is reused for multi tessellation types.

As such the setup logic and output logic each include logic units such as index reordering logic, barycentric coordinate generation logic, fix to floating point converting logic or any other desired logic that is controllable by control logic based on the type of tessellation detected to be used for the incoming primitive so that logic is reused.

The setup logic includes interpolators for computing delta_u and delta_v, using values from the lookup table. Such interpolators are used for all the primitive types and tessellation types. The shared tessellation logic produces barycentric coordinate data or reordered vertex indice data and quad primitive identification data depending upon the type of incoming primitive. The edge walker logic includes a state machine that carries out the operations shown in the flow chart in FIG. 4. The processing of inner quads and the determination of the number of quads in a given primitive type or comparing the number of segments for inner quads are states that are shared for continuous and adaptive tessellation operations.

Figure 8:
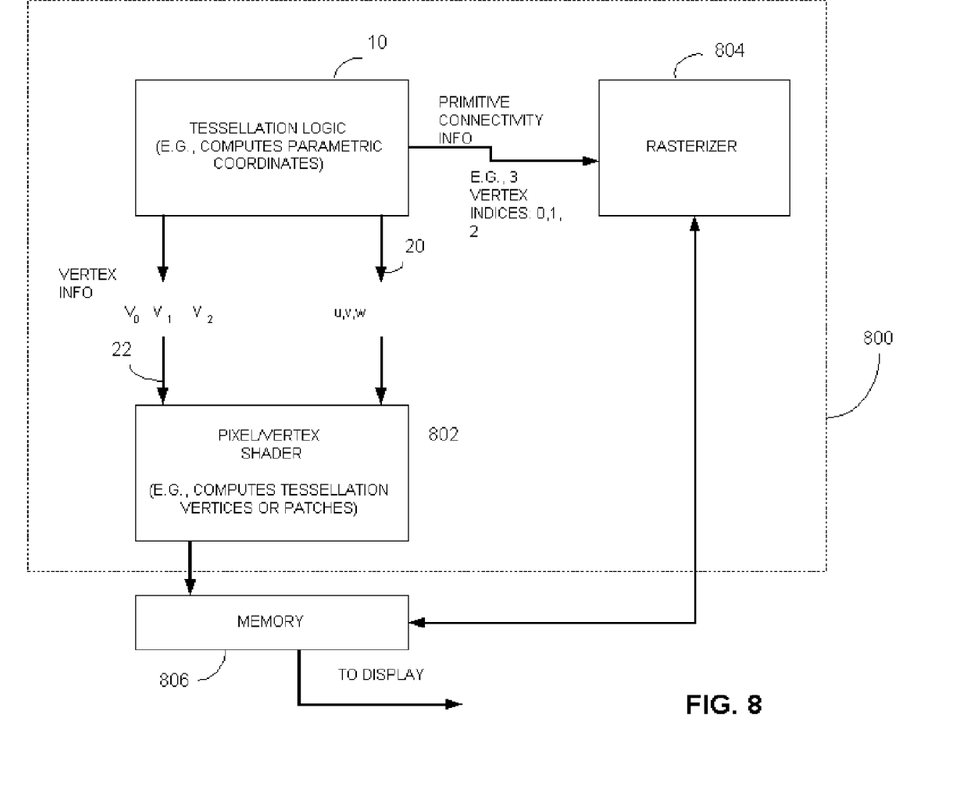
FIG. 8 is a functional block diagram illustrating an example of an apparatus that provides tessellation in accordance with one embodiment to the invention.

FIG. 8 is a block diagram illustrating one example of an apparatus that employs the tessellation logic 10 wherein the apparatus may be for example a graphics processor, or other suitable graphics processing circuit. Accordingly, apparatus 800 may be integrated on a die if desired. The apparatus 800 includes the pixel/vertex shader 802 that receives the parametric coordinate information 20 and the reordered indice information 22 to compute tessellation vertices for various patches, as known in the art. The vertex shader 802 may be any suitable logic capable of computing tessellation vertices based on the information provided by the tessellation logic 10. As shown in this figure, a rasterizer 804 may receive primitive connectivity information 805 in which primitives are connected to one another so that the rasterizer may then organize the information for storage in memory 806 which then gets retrieved for display on a suitable display device.

Figure 9:
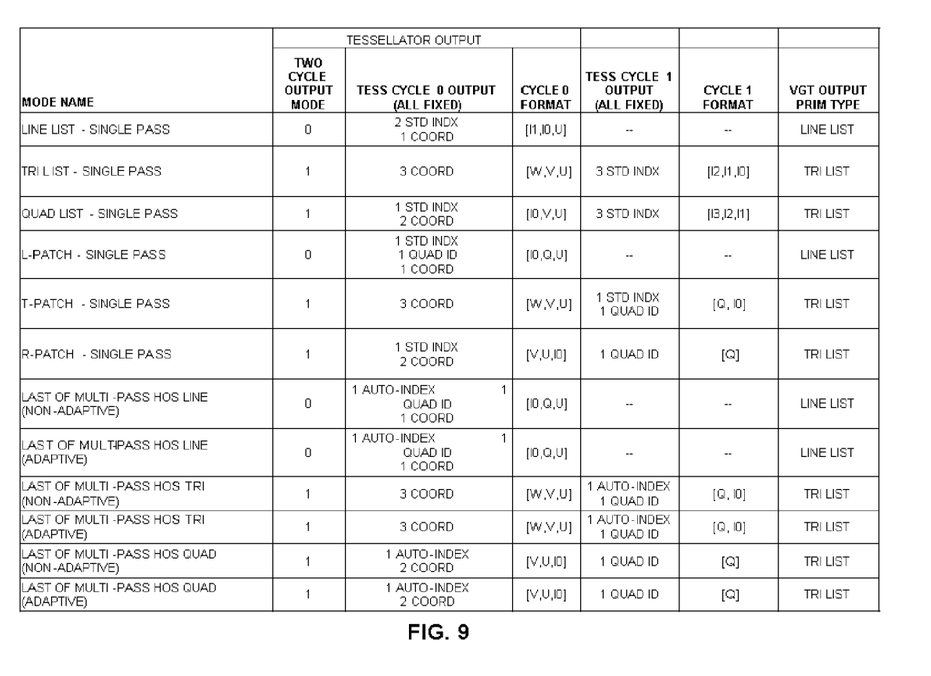
FIG. 9 is a table illustrating an example of parametric coordinate output information output by a tessellation circuit in accordance with one embodiment of the invention.

FIG. 9 is a table illustrating the different modes of operation depending upon the primitive type and the output or subprimitive coordinates in parametric space that are output by, for example, the aforedescribed tessellation circuit 10. This table indicates how many cycles it takes to output a sub-vertex parametric coordinate(s). Since, in one example the tessellation engine interface to shader pipes is limited to 96-bits, only 3 32-bits values can be sent in one cycle. For example for a line primitive, tessellation will send i0, i1 and u, where i0, i1 are indices and u is a parametric coordinate for a line. Since these are 3 32-bit values, such information will be passed in one cycle to the shader pipe. For a primitive type triangle, i0, i1, i2, u, v, w are issued by a tessellation engine. These are 6 32-bits values and hence will take 2 cycles to send to the shader pipe. As such, the tessellator output shown in FIG. 9 is then provided, for example, to the vertex shader 802 or other suitable processing device to compute the tessellation vertices for the subprimitives. These vertices are then determined in, for example, XYZ coordinate space.

The above detailed description of the invention and the examples described therein have been presented for the purposes of illustration and description only and not by limitation. Also, the word "coupled" means directly or indirectly coupled to facilitate operation of the circuit. It is therefore contemplated that the present invention cover any and all modifications, variations or equivalents that fall within the spirit and scope of the basic underlying principles disclosed above and claimed herein.

What is claimed is:

1. A graphics processor comprising:
a tessellation circuit in the graphics processor comprising:
(a) control logic operatively coupled to receive tessellation instruction information and to determine one of a plurality of different types of tessellation to be performed on an input primitive; and
(b) shared hardware tessellation logic operatively coupled to the control logic and including a plurality of shared hardware logic units that are controllable by the control logic based on at least the tessellation instruction information and the input primitive, wherein the shared hardware tessellation logic is capable of reusing at least one of the shared hardware logic units for at least two different tessellation types wherein at least one of the shared hardware logic units comprises setup logic operatively responsive to data representing primitive type, tessellation type and indices.

2. The tessellation circuit of claim 1 wherein the different tessellation types include at least two of the following: discrete tessellation, continuous tessellation, and adaptive tessellation.

3. The tessellation circuit of claim 1 wherein the shared hardware logic units include at least setup logic, walker logic, and output logic, each comprising logic units that are controllable by the control logic.

4. The tessellation circuit of claim 3 wherein the setup logic includes interpolators that are reused for both adaptive and continuous tessellation types and wherein the tessellation circuit produces parametric coordinates for use in determining subprimitive vertices.

5. The tessellation circuit of claim 3 wherein the shared hardware tessellation logic is controlled by the control logic to generate parametric coordinate data for all of the different types of primitives from the group of lines, triangles, quad primitives, line patches, tri patches, and rectangular patches.

6. The tessellation circuit of claim 3 wherein the shared hardware tessellation logic produces at least one of: barycentric coordinate data, reordered vertex indice data, and quad primitive identification data depending upon a type of incoming primitive.

7. The tessellation circuit of claim 3 wherein the walker logic is comprised of a state machine and wherein states of the state machine are shared for continuous and adaptive tessellation operations.

8. A graphics processor comprising:
a tessellation circuit in the graphics processor comprising:
(a) control logic operative to determine one of a plurality of different types of tessellations to be performed on an input primitive based on tessellation instruction data, wherein the different types of tessellation include at least: discrete tessellation, continuous tessellation, and adaptive tessellation; and
(b) shared hardware tessellation logic, operatively coupled to the control logic, and including:
setup logic operatively responsive to data representing primitive type, tessellation type and indices;
walker logic; and
output logic;
the setup logic and the output logic each comprising hardware logic units that are controllable by the control logic based on a type of tessellation detected to be used for the incoming primitive, to reuse at least some of the hardware logic units for at least two different tessellation types.

9. The tessellation circuit of claim 8 wherein the setup logic includes interpolators that are reused for both adaptive and continuous tessellation types and wherein the tessellation circuit produces parametric coordinates for use in determining subprimitive vertices.

10. The tessellation circuit of claim 8 wherein the walker logic is comprised of a state machine and wherein states of the state machine are shared for continuous and adaptive tessellation operations.

11. A method for tessellating primitives comprising:
(a) analyzing tessellation instruction information and an input primitive to determine one of a plurality of different types of tessellation to be performed on the input primitive; and
(b) controlling shared hardware tessellation logic in a tessellation circuit based on the tessellation instruction information and the input primitive, the shared hardware tessellation logic includes a plurality of shared hardware logic units, wherein the shared hardware tessellation logic may reuse at least one of the shared hardware logic units for at least two different tessellation types and wherein at least one of the shared hardware logic units comprises setup logic operatively responsive to data representing primitive type, tessellation type and indices.

12. The method of claim 11 wherein the different types of tessellation include at least one of the following: discrete tessellation, continuous tessellation, and adaptive tessellation.

13. The method of claim 11 wherein the method includes reusing interpolators for both adaptive and continuous tessellation types and wherein the tessellation circuit produces parametric coordinates for use in determining subprimitive vertices.

14. The method of claim 11 wherein the method includes generating coordinate data for all of the different types of primitives from the group of lines, triangles, quad primitives, line patches, tri patches, and rectangular patches.

15. The method of claim 11 wherein the method includes producing at least one of: barycentric coordinate data, recorded vertex indice data, and quad primitive identification data depending upon a type of incoming primitive.

16. The method of claim 11 wherein one of the shared hardware logic units is an edge walker comprised of a state machine, wherein states of the state machine are shared for continuous and adaptive tessellation operations.

* * * * *